United States Patent
Hughes et al.

(10) Patent No.: US 7,945,736 B2
(45) Date of Patent: *May 17, 2011

(54) DYNAMIC LOAD MANAGEMENT OF NETWORK MEMORY

(75) Inventors: David Anthony Hughes, Los Altos, CA (US); Zhigang Yin, Mountain View, CA (US); John Burns, Los Altos, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/622,324

(22) Filed: Nov. 19, 2009

(65) Prior Publication Data

US 2010/0070605 A1 Mar. 18, 2010

Related U.S. Application Data

(63) Continuation of application No. 11/724,800, filed on Mar. 15, 2007, now Pat. No. 7,644,230.

(51) Int. Cl.
*G06F 12/00* (2006.01)
*G06F 13/00* (2006.01)
*G06F 13/28* (2006.01)
*G06F 15/167* (2006.01)
*G06F 15/173* (2006.01)

(52) U.S. Cl. ........ 711/117; 711/147; 711/154; 711/159; 711/E12.016; 709/213; 709/223

(58) Field of Classification Search .................. None
See application file for complete search history.

(56) References Cited

U.S. PATENT DOCUMENTS

| | | | |
|---|---|---|---|
| 6,618,397 B1 | 9/2003 | Huang | |
| 7,120,666 B2 | 10/2006 | McCanne et al. | |
| 7,215,667 B1 | 5/2007 | Davis | |
| 7,388,844 B1 | 6/2008 | Brown | |
| 7,555,484 B2 * | 6/2009 | Kulkarni et al. | 1/1 |
| 2002/0163911 A1 | 11/2002 | Wee | |
| 2002/0194324 A1 * | 12/2002 | Guha | 709/223 |
| 2004/0117571 A1 * | 6/2004 | Chang et al. | 711/162 |
| 2004/0243571 A1 * | 12/2004 | Judd | 707/3 |
| 2007/0258468 A1 | 11/2007 | Bennett | |

OTHER PUBLICATIONS

"Shared LAN Cache Datasheet", 1996 http://www.lancache.com/slcdata.htm.*
Muthitacharoen, Athicha et al., "A Low-bandwidth Network File System," 2001, in Proc. Of the 18th ACM Symposium on Operating Systems Principles, Banff, Canada, pp. 174-187.

* cited by examiner

*Primary Examiner* — Matt Kim
*Assistant Examiner* — Ralph A Verderamo, III
(74) *Attorney, Agent, or Firm* — Carr & Ferrell LLP

(57) ABSTRACT

A system for managing network memory comprises a communication interface and a processor. The communication interface receives a status message from another appliance. The status message indicates an activity level of a faster memory and a slower memory associated with the other appliance. The communication interface also receives a data packet. The processor processes the status message to determine the activity level of the faster memory and the slower memory. The processor also processes the data packet to identify any matching data in the other appliance and estimate whether the matching data is stored in the faster memory based on the activity level. Based on the estimate, the processor determines whether to generate an instruction to retrieve the matching data.

20 Claims, 7 Drawing Sheets

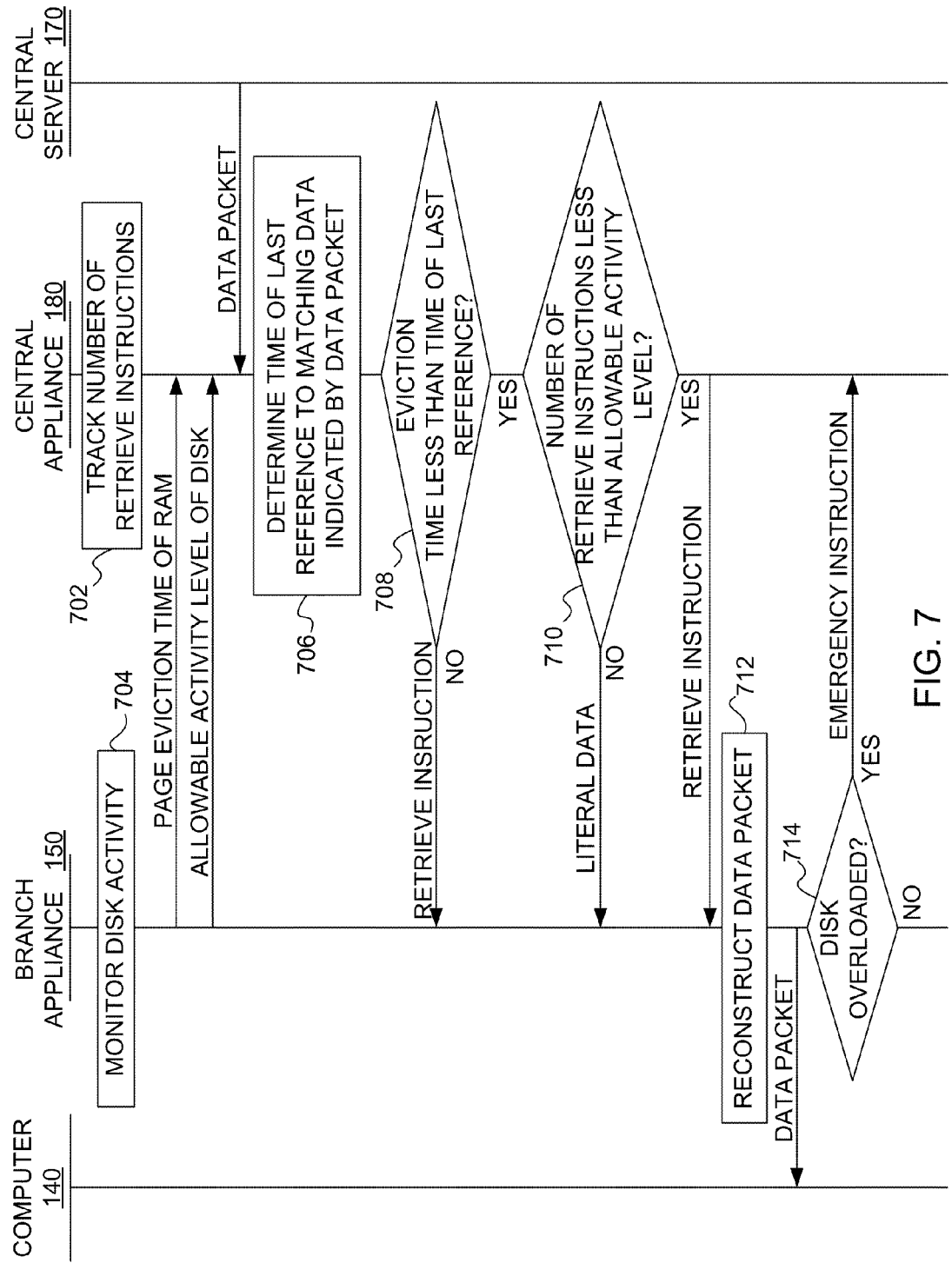

DYNAMIC LOAD MANAGEMENT OF NETWORK MEMORY

CROSS REFERENCE TO RELATED APPLICATIONS

This application is a continuation and claims the priority benefit of U.S. patent application Ser. No. 11/724,800 filed Mar. 15, 2007 now U.S. Pat. No. 7,644,230 and entitled "Dynamic Load Management of Network Memory." U.S. patent application Ser. No. 11/724,800 is related to U.S. patent application Ser. No. 11/357,657 filed Feb. 16, 2006 entitled "Ensuring Data Integrity in Network Memory," which is a continuation-in-part of U.S. patent application Ser. No. 11/202,697 filed Aug. 12, 2005 entitled "Network Memory Architecture." The disclosures of the aforementioned applications are incorporated herein by reference.

BACKGROUND

Field of the Invention

This invention is related to data transfer over a computer network and more specifically to dynamic load management of network memory.

SUMMARY OF THE INVENTION

Various embodiments of the invention provide a system for network memory management comprising a communication interface and a processor. The communication interface receives a status message from another appliance. The status message indicates an activity level of a faster memory and a slower memory associated with the other appliance. The communication interface also receives a data packet. The processor processes the status message to determine the activity level of the faster memory and the slower memory. The processor also processes the data packet to identify any matching data in the other appliance and estimate whether the matching data is stored in the faster memory based on the activity level. The processor also determines whether to generate an instruction to retrieve the matching data based on the estimate.

The processor may limit data access to the slower memory in the other appliance, modify a slower memory access count, and estimate (e.g., monitor) the activity level of the slower memory. The processor may generate another instruction to transmit the matching data if the activity level of the slower memory is above a maximum activity level. The activity level may comprise a rate of access to the slower memory or a period of data eviction in the faster memory. The status message may indicate an allowable activity level of the slower memory, an eviction period, or a bitmap index. The faster memory may, for example, comprise a random access memory, while the slower memory may comprise a disk memory.

The invention also provides for a method for managing network memory in which a second appliance receives a status message from a first appliance. The status message indicates an activity level of a faster memory and a slower memory associated with the first appliance. The second appliance also receives a data packet from the first appliance. The second appliance further processes the status message to determine an activity level of the faster memory and the slower memory in the first appliance and to identify any matching data in the faster memory or the slower memory. The method further includes estimating whether the matching data is stored in the first appliance based on the activity level, and also includes determining whether to generate an instruction to retrieve the matching data based on the estimate.

The invention also provides for a computer readable storage medium having embodied thereon a program, the program being executable by a processor for performing a method for network memory management in which a second appliance receives a status message from a first appliance. The status message indicates an activity level of a faster memory and a slower memory associated with the first appliance. The second appliance also receives a data packet from the first appliance. The second appliance further processes the status message to determine an activity level of the faster memory and the slower memory in the first appliance and identify any matching data in the first appliance. The method further includes estimating whether the matching data is stored in the faster memory based on the status message, and also includes determining whether to generate an instruction to retrieve the matching data based on the estimate.

BRIEF DESCRIPTION OF THE DRAWINGS

FIG. 7 is a flowchart of message sequence that may be used in an embodiment of the network memory management system.

DETAILED DESCRIPTION OF THE INVENTION

Figure 1:
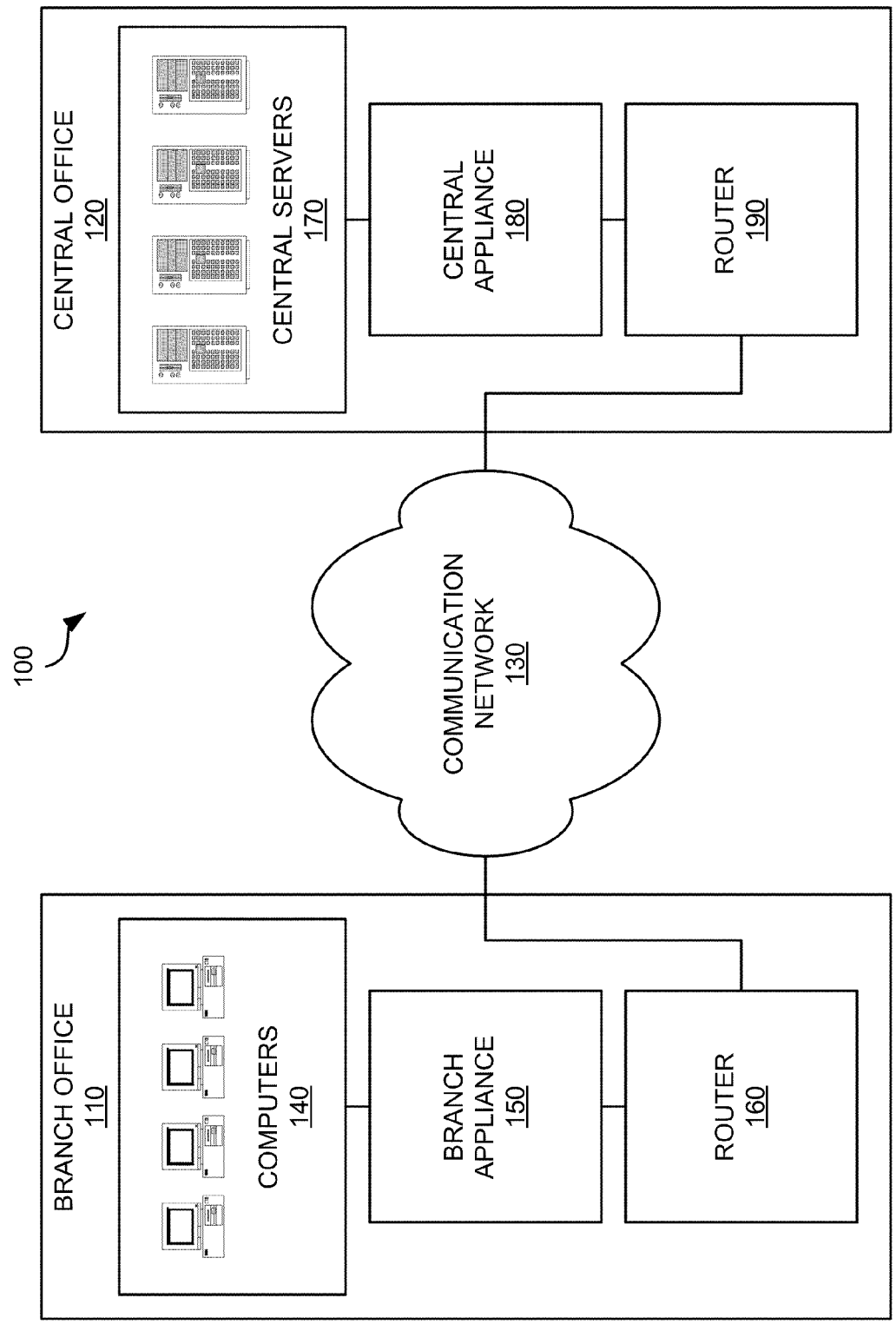
FIG. 1 illustrates a network memory management system in one embodiment of the present invention.

The embodiments discussed herein demonstrate possible implementations of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A network memory system generally comprises two appliances which transmit, receive, and store data. Each appliance may be coupled to a local network (e.g., local area network). The appliances may communicate over a third network, such as a wide area network or Internet.

As data is transmitted from one local network to another, the data may pass through at least one appliance. The appliance can store a copy of the data transmitted or received. As a result, an appliance can provide previously stored data to a device on the local network rather than downloading the previously stored data from other remote sources. Moreover, each appliance can track and/or estimate the data stored by other appliances. As a result, each appliance can remotely command another appliance to provide data directly to a device on a local network. This process is further described in U.S. patent application Ser. No. 11/202,697 filed Aug. 12, 2005 entitled "Network Memory Architecture" which is hereby incorporated by reference.

Each appliance comprises a faster memory (e.g., RAM) and a slower memory (e.g., hard disk). When an appliance receives data, the data may be stored in both the faster memory and the slower memory. However, the data within the faster memory may be quickly overwritten (i.e., evicted) in favor of newly received data while the data within the slower memory may be maintained.

An appliance (i.e., transmitting appliance) may estimate whether desired data is likely stored in the faster memory of another appliance (i.e., receiving appliance). The transmission of data from the faster memory can be faster than the retrieval and transmission of data from slow memory. Based on the estimate, the appliance may send a retrieve instruction to the other appliance.

An appliance can also determine the relative activity (e.g., load) of another appliance. In an example, the transmitting appliance can determine whether desired data is stored in the slower memory of the receiving appliance as well as the receiving appliance's activity level. If the activity level is high, the receiving appliance may not have the ability to transmit data from the slower memory. As a result, the transmitting appliance can determine to wait a predetermined time before sending a request to the receiving appliance to transmit data from the slower memory. Alternately, the transmitting appliance may simply transmit the data (literally) over the communication network without relying on transmission from the memory of the receiving appliance.

FIG. 1 illustrates an embodiment of a network memory system 100 according to the present invention. The network memory system 100 includes a branch office 110, a central office 120, and a communication network 130. The branch office 110 includes computers 140, a branch appliance 150, and a router 160. The central office 120 includes central servers 170, a central appliance 180, and a router 190.

In the branch office 110, the computers 140 are linked to the branch appliance 150. The branch appliance 150 is linked to the router 160. The router 160 is coupled to the communication network 130. In the central office 120, the central servers 170 are linked to the central appliance 180. The central appliance 180 is linked to the router 190. The router 190 is coupled to the communication network 130.

For the sake of simplicity, FIG. 1 illustrates the network memory system 100 having a single branch office 110 and a single central office 120. The principles discussed herein are equally applicable to multiple branch offices 110 (not shown) and to multiple central offices 120 (not shown) which are similarly coupled to the communication network 130. Branch office/branch office communication and central office/central office communication, as well as multi-appliance and/or multi-node communication and bi-directional communication are further within the scope of the disclosure.

The communication network 130 comprises hardware and/or software elements that enable the exchange of information (e.g., voice and data) between the branch office 110 and the central office 120. Possible implementations of the communication network 130 include a private wide-area network (WAN), and the Internet. Typical connections from the branch office 110 to the communication network 130 (e.g., from the router 160 and the router 190) may include ISDN, T1 lines (1.544 Mbps), and broadband connections such as digital subscriber lines (DSL) and cable modems. Other examples include T3 lines (43.232 Mbps), OC3 (155 Mbps), and OC48 (2.5 Gbps), although these are more costly and more likely to be used for interconnection at the central office 120 or as the backbone of the communication network 130.

The branch appliance 150 comprises hardware and/or software elements configured to receive data (e.g., email, files, and databases transactions), determine whether a portion of the data is locally accessible to another appliance (e.g., the central appliance 180), generate an instruction based on the determination, and transfer the instruction to the other appliance. The branch appliance 150 also comprises hardware and/or software elements configured to receive an instruction from another appliance (e.g., the central appliance 180), process the instruction to obtain data, and transfer the data to a computer (e.g., the computers 140).

Locally accessible data comprises any data transferable to the computer (e.g., the computers 140 and the central servers 170) by an appliance (e.g., the branch appliance 150 and the central appliance 180) without transferring the data over the communication network 130. In some examples, the locally accessible data is stored in random access memory (RAM) in the branch appliance 150, on a hard drive in the branch appliance 150, or both. In another example, the locally accessible data is accessible by the branch appliance 150 over a local communication network (such as a LAN), for example, in a network attached storage (NAS) device that is internal or external to the branch office 110, and/or in an optical or flash storage device.

The instruction to be received by the branch appliance 150 comprises any message or signal that indicates an action to perform with the data. An instruction may indicate to the branch appliance 150 to store the data, to retrieve the data, or to forward the data to, for example, the computers 140. The instruction may be explicit, or may be implicit and based upon instructions indicating to store or retrieve data. In some embodiments, the instruction may indicate an index within a database for storing and retrieving the data.

The central appliance 180 similarly comprises hardware and/or software elements configured to receive data to be sent to the computer 140, determine whether a portion of the data is locally accessible to the branch appliance 150, generate an instruction based on the determination, and transfer the instruction to the other appliance. The central appliance 180 also comprises hardware and/or software elements configured to receive an instruction from another appliance (e.g., the branch appliance 150), process the instruction to obtain the data, and transfer the data to a computer (e.g., the central servers 170). The branch appliance 150 and central appliance 180 are further discussed in U.S. nonprovisional application Ser. No. 11/240,110 filed Sep. 29, 2005 entitled "Network Memory Appliance" which is hereby incorporated by reference.

As illustrated, the branch appliance 150 is located in-line between the computers 140 and the router 160. The central appliance 180 is also located between the central server 170 and the router 190. The branch appliance 150 and the central appliance 180 transparently intercept network traffic between the computers 140 and the central servers 170. For example, the central appliance 180 transparently intercepts data sent from the central servers 170 and addressed to the computers 140. The computers 140 and the central servers 170 advantageously require no additional configuration because the branch appliance 150 and the central appliance 180 operate transparently.

Alternatively, the branch appliance 150 and the central appliance 180 may be configured as an additional router or gateway. As a router, for example, the branch appliance 150 appears to the computers 140 as an extra hop before the router 160. In some embodiments, the branch appliance 150 and the central appliance 180 provide redundant routing or peer routing with the router 160 and the router 190.

It will be understood that the central appliance 180 accesses a record indicating data sent previously to the branch appliance 150 when generating instructions. For example, the central appliance 180 may locally store data sent to the branch appliance 150. If the data is to be transferred again from the central appliance 180 to the branch appliance 150, the central appliance 180 may determine that the data is locally accessible to the branch appliance 150 and generate an instruction to the branch appliance 150 to retrieve the data from its locally accessible memory. The central appliance 180 sends the instruction to the branch appliance 150 and the branch appliance 150 processes the instruction to obtain the data. Subsequently, if the branch appliance 150 is to transfer the same data to the central appliance 180, the branch appliance 150 may make a determination based on having received the data from the central appliance 180 originally. The branch appliance 150 determines that the data is therefore locally accessible to the central appliance 180 and generates an instruction to the central appliance 180 to retrieve the data and transmits it. The central appliance 180 then processes the instruction to obtain the data. Therefore, an appliance (e.g., the branch appliance 150 and the central appliance 180) in the network memory system 100 advantageously uses data transferred to and from the appliance to reduce network traffic with other appliances in the network memory system 100.

In various embodiments, the network memory system 100 can advantageously provide increased productivity, reduced IT costs, and enhanced data integrity and compliance. The network memory system 100 can improve application performance and data access in the branch office 110 and central office 120 because not every response to a data request generated by the computers 140 or the central server 170 travels over the communication network 130 from the central servers 170. The branch appliance 150 and the central appliance 180 can also store and retrieve a local copy of the data for subsequent exchanges of the data.

Despite these advantages, the network memory system 100 may operate slower than expected because the appliance receiving the instruction can not process the instruction quickly enough. When the instruction is not processed quickly enough, subsequent instructions must be queued or otherwise stored until the appliance is able to process the waiting instructions. For example, multiple branch appliances 150 may transmit instructions to a central appliance 180 and slow down the central appliance 180. As these data packets accumulate, the central appliance 180 may not be able to generate instructions quickly enough to avoid a backlog.

In various embodiments, an appliance (e.g., branch appliance 150) can determine or estimate the efficiency of data transmission of another appliance (e.g., central appliance 180). In one example, a branch appliance 150 estimates if desired data is likely to be within the faster memory or slower memory of a central appliance 180. If the desired data is likely to be within the faster memory, the branch appliance 150 can transmit an instruction to the central appliance 180 to provide the desired data. If the desired data is likely to be within the slower memory, the branch appliance 150 may determine the activity level of the central appliance 180.

If the central appliance 180 is overloaded, the branch appliance 150 can pause before transmitting an instruction for the transmission of the desired data. Alternately, the branch appliance 150 may, itself, send the desired data (literally).

Figure 2:
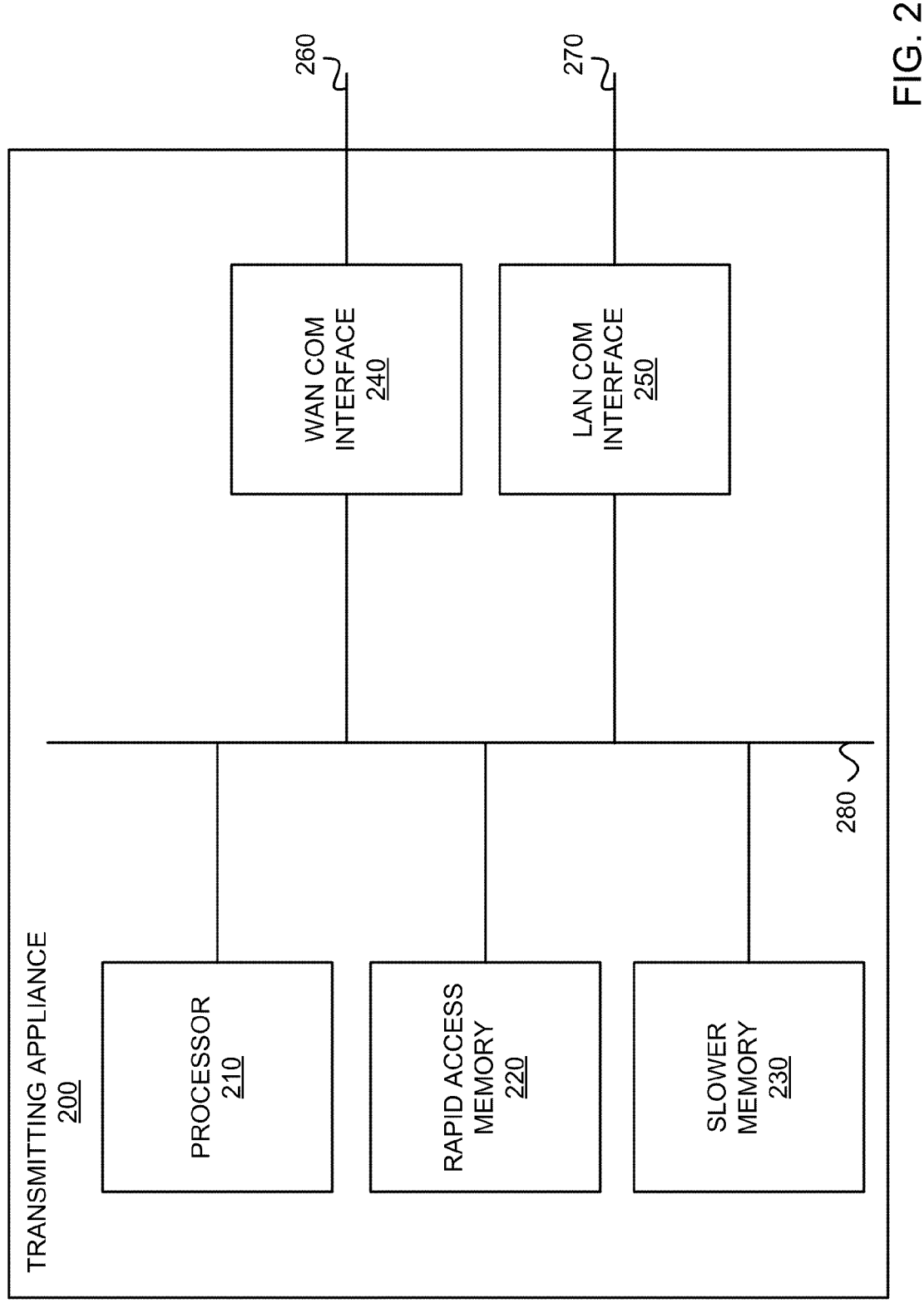
FIG. 2 is a block diagram of a transmitting appliance in one embodiment of the present invention.

FIG. 2 is a block diagram of a transmitting appliance 200, in an embodiment of the invention. The transmitting appliance 200 may be a central appliance 180 or a branch appliance 150. The transmitting appliance 200 comprises a processor 210, a rapid access memory 220, a slower memory 230, a WAN communication interface 240, and a LAN communication interface 250. A system bus 280 links the components together. Line 260 links the WAN communication interface 240 to a router, e.g. router 190 (FIG. 1). Line 270 links the LAN communication interface 250 to, e.g., the central servers 170 (FIG. 1). Alternatively, in other embodiments, the transmitting appliance 200 may include hardware and/or software elements providing additional processing, communication, and storage capacity.

Figure 3:
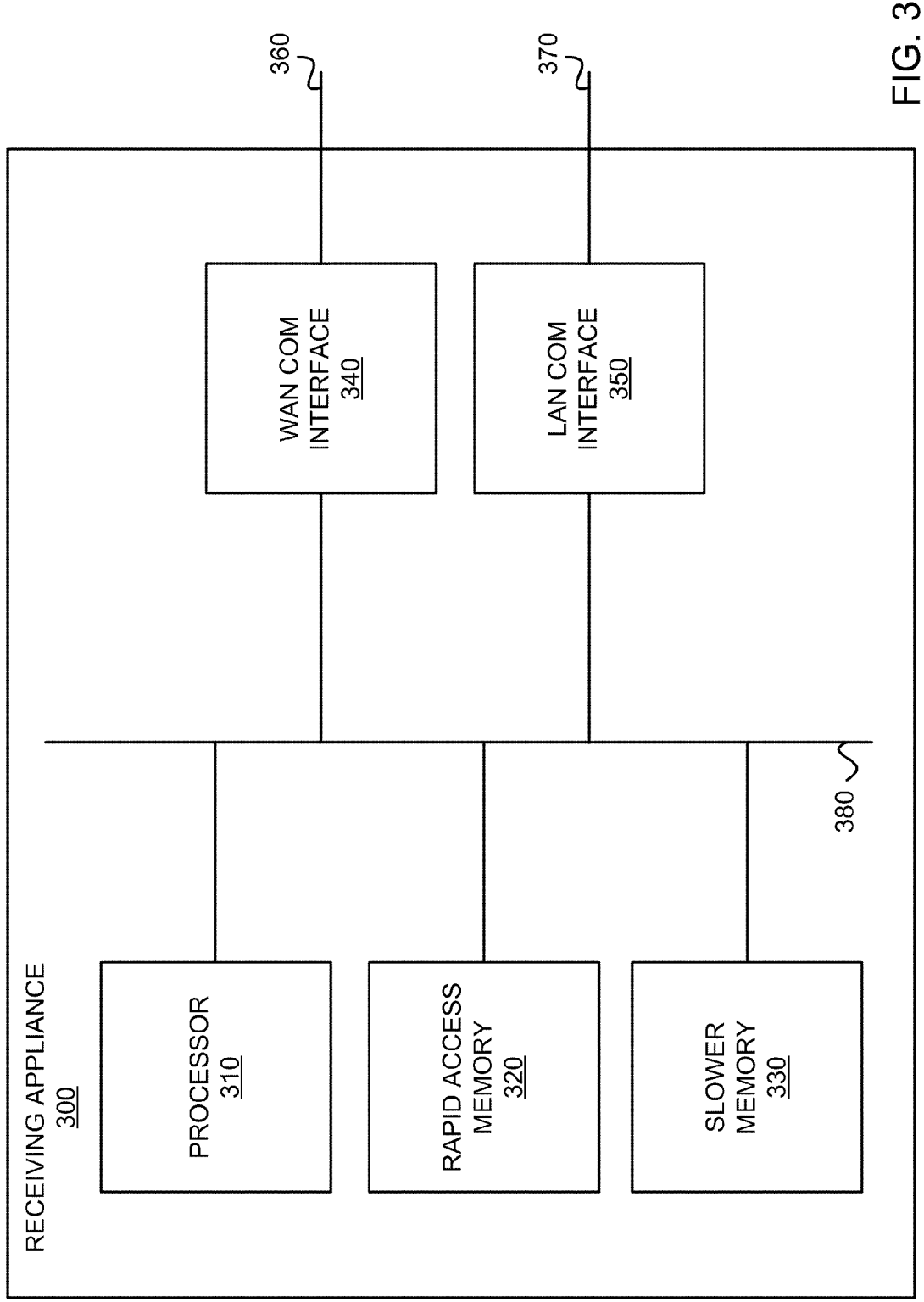
FIG. 3 is a block diagram of a receiving appliance in one embodiment of the present invention.

A communication interface, comprising the WAN communication interface 240 and the LAN communication interface 250, may receive a data packet and a status message from a receiving appliance (further discussed in FIG. 3.). The status message indicates the level of activity of the disk memory in the receiving appliance and/or an indication of an allowable level of activity within the receiving appliance. The data packet indicates data being requested by the computer 140. The term, "matching data," refers to the data stored in the receiving appliance that matches the data indicated by the data packet. The processor 210 may process the status message to determine an activity level of one or more memories in the receiving appliance, process the data packet to identify matching data, estimate in which memory the matching data is stored in the receiving appliance by comparing the data in the status message received from the receiving appliance and the number of instructions previously sent to the receiving appliance, and generate an instruction for retrieval of the matching data based on the estimate. In some embodiments, the processor 210 transmits the matching data to the branch appliance 150.

The rapid access memory 220, or other faster memory, requires less time than the slower memory 230 to perform a read or write operation. Thus, retrieving data from the rapid access memory 220 in response to an instruction is faster if the data is stored in the rapid access memory 220. The rapid access memory 220 may comprise random access memory (RAM) and/or other types of memory such as flash memory that have an access time less than an access time of the slower memory 230. The rapid access memory 220 may be volatile or have a limited amount of storage space. The slower memory 230, or other slower memory, may comprise a hard disk, removable storage, or flash memory that is non-volatile and/or has greater storage capacity than the faster memory.

A database stored in the rapid access memory 220 and/or the slower memory 230 is configured to store data in an organized format to allow the processor 210 to store, modify, and retrieve the data. The database may organize the data to enable the determination of whether a portion of the data is locally accessible to a receiving appliance, and to enable quick retrieval of locally accessible data to the transmitting appliance 200.

FIG. 3 is a block diagram of a receiving appliance 300 in an embodiment of the invention. The receiving appliance 300 may be a central appliance 180 or a branch appliance 150. The receiving appliance 300 comprises a processor 310, a rapid access memory 320, a slower memory 330, a WAN communication interface 340, and a LAN communication interface 350. A system bus 380 links the components together. Line 360 links the WAN communication interface 340 to a router, e.g., router 160 (FIG. 1). Line 370 links the LAN communication interface 350 to, e.g., the central servers 170 (FIG. 1). A branch appliance 150 or a central appliance 180 may simultaneously operate as a receiving appliance 300 and as a transmitting appliance 200.

Figure 4:
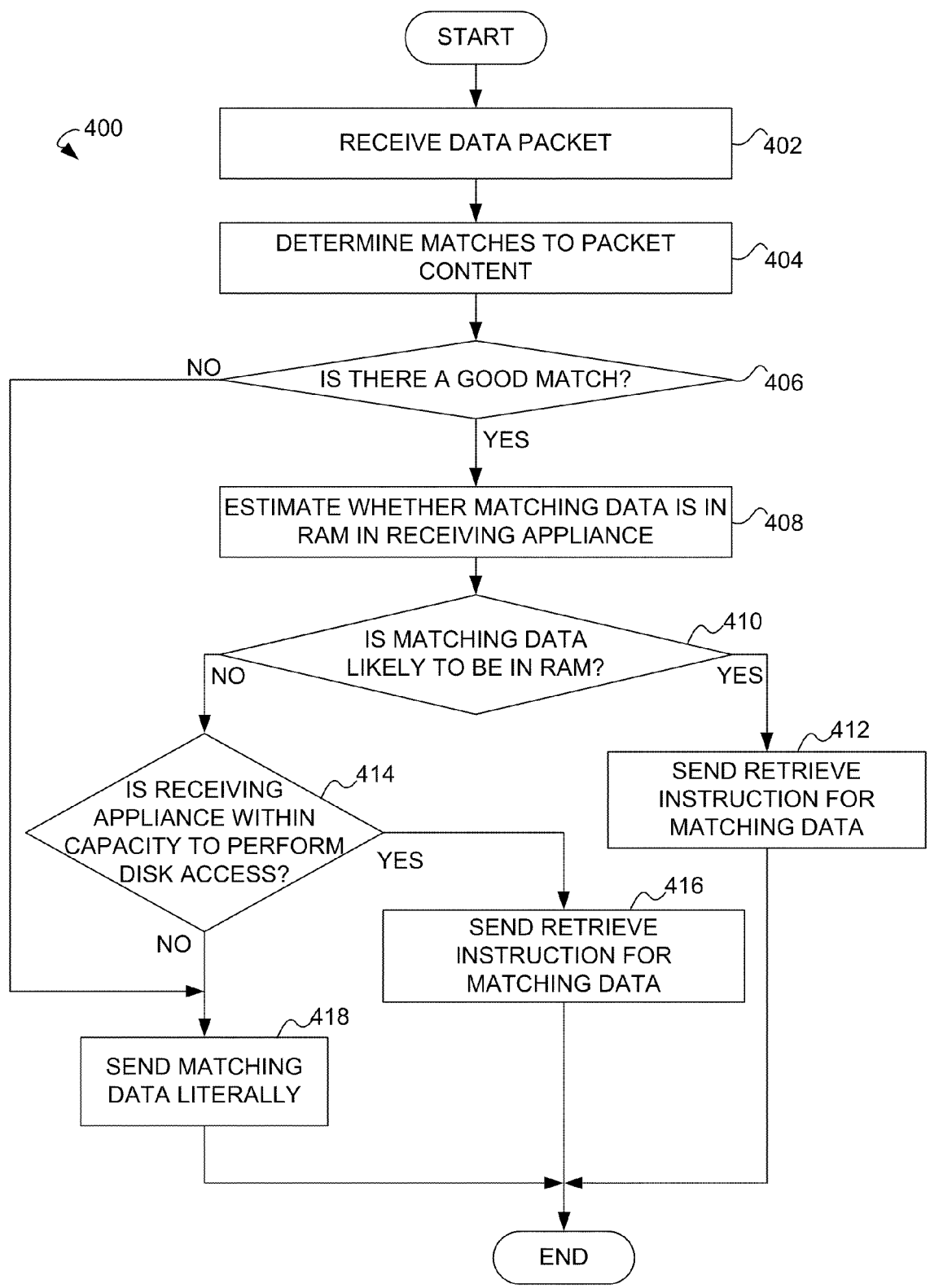
FIG. 4 is a flowchart of a method for determining a transmission technique in one embodiment of the present invention.

FIG. 4 is a flowchart of a data transmission technique according to an embodiment of the invention. The process 400 may be performed by a transmitting appliance 200 to determine how the data should be sent in response to a data packet received from a computer 140 or a central server 170 to avoid sending too many instructions that will require retrieval from the slower memory 330 in the receiving appliance 300. Thus, the receiving appliance 300 is less likely to be overloaded and slow down.

In step 402, the transmitting appliance 200 receives a data packet from a central server 170 or a computer 140 indicating that data is to be sent via the communication network 130. For example, the transmitting appliance 200 can be the central appliance 180 which receives the data packet from the central server 170.

In step 404, the transmitting appliance 200 determines whether locally accessible data stored in the receiving appliance 300 matches the data indicated by the data packet received in step 402. The matches may be determined according to data fingerprinting techniques as disclosed in U.S. patent application Ser. No. 11/357,657 entitled "Ensuring Data Integrity in Network Memory" filed Feb. 16, 2006, which is hereby incorporated herein by reference.

In step 406, the transmitting appliance 200 determines whether there is a good match to the packet content in the receiving appliance 300. In some instances, only a portion of the data may be available to the locally accessible memory in the receiving appliance 300. For example, the matching data, or a portion thereof, may not be locally accessible to the receiving appliance 300. If there is not a good match to the packet content, the transmitting appliance 200 will send the literal data to the receiving appliance 300 (see step 416). If there is a good match with the data, or a portion thereof, that is locally accessible to the receiving appliance 300, the transmitting appliance 200 continues to step 408.

In step 408, the transmitting appliance 200 estimates whether the matching data is in rapid access memory 320 in the receiving appliance 300. The transmitting appliance 200 may make the estimate according to an activity level of the rapid access memory 320 or using a bitmap index.

The activity level of the rapid access memory 320 is conveyed by a periodic transmission of data from the receiving appliance. The activity level is an indication of the turnover of the data stored in the rapid access memory 320. For example, the activity level may indicate an eviction period of data in the rapid access memory 320 or the turnover rate of the RAM to the disk. Other embodiments may indicate the activity level of the rapid access memory 320 using a bitmap index or other representation of a sparse set of bits of the contents in the rapid access memory 320.

In step 410, the transmitting appliance 200 determines whether the matching data or a portion of the matching data is likely to be in the rapid access memory 320. If the matching data is likely to be in rapid access memory 320, the transmitting appliance 200 sends a retrieve instruction indicating the matching data to the receiving appliance 300 in step 412.

If the matching data is not likely to be in the rapid access memory 320, the transmitting appliance 200 determines whether the receiving appliance 300 has the capacity to access a disk in step 414. The disk access is performed when the matching data is locally accessible to the receiving appliance 300 and stored in the slower memory 330. In some embodiments, the transmitting appliance 200 may estimate an activity level of the slower memory 330 based on a calculated threshold such as a maximum activity level, an emergency instruction, or other means known to one skilled in the art.

In step 416, if the receiving appliance 300 has the capacity to access the disk, the transmitting appliance 200 sends a retrieve instruction for the matching data. In other embodiments, the transmitting appliance 200 may determine whether to delay transmission of the retrieve instruction. For example, if the receiving appliance 300 is approaching the maximum number of disk accesses possible within, for example, a 100 millisecond period, the transmitting appliance 200 may delay sending the retrieve instruction until the next 100 millisecond period. The retrieve instruction sent in step 416 may be substantially similar to the retrieve instruction sent in step 412. In alternative embodiments, the retrieve instruction sent in step 416 may comprise more or less information than the retrieve instruction sent in step 412.

In step 418, if the receiving appliance does not have the capacity to perform a disk access, the transmitting appliance 200 sends the matching data literally rather than an instruction to retrieve the data. "Sending data literally" means sending the data itself as opposed to sending an instruction to retrieve the data regardless of whether the data exists in the network memory appliance. For example, the transmitting appliance 200 sends data to the receiving appliance 300 so that the receiving appliance 300 does not perform a disk access or retrieve the matching data from the rapid access memory 320. "Literal data" is the data sent to the receiving appliance 300 that does not require a retrieve to be performed. In this way and/or by delaying transmission of instructions, the transmitting appliance 200 limits data access to the slower memory 330. In some embodiments, the data or an update associated with the data is sent literally if there are no good matches as described in step 406. The receiving appliance 300 may then store the literal data in the rapid access memory 320 or in the slower memory 330.

Figure 5:
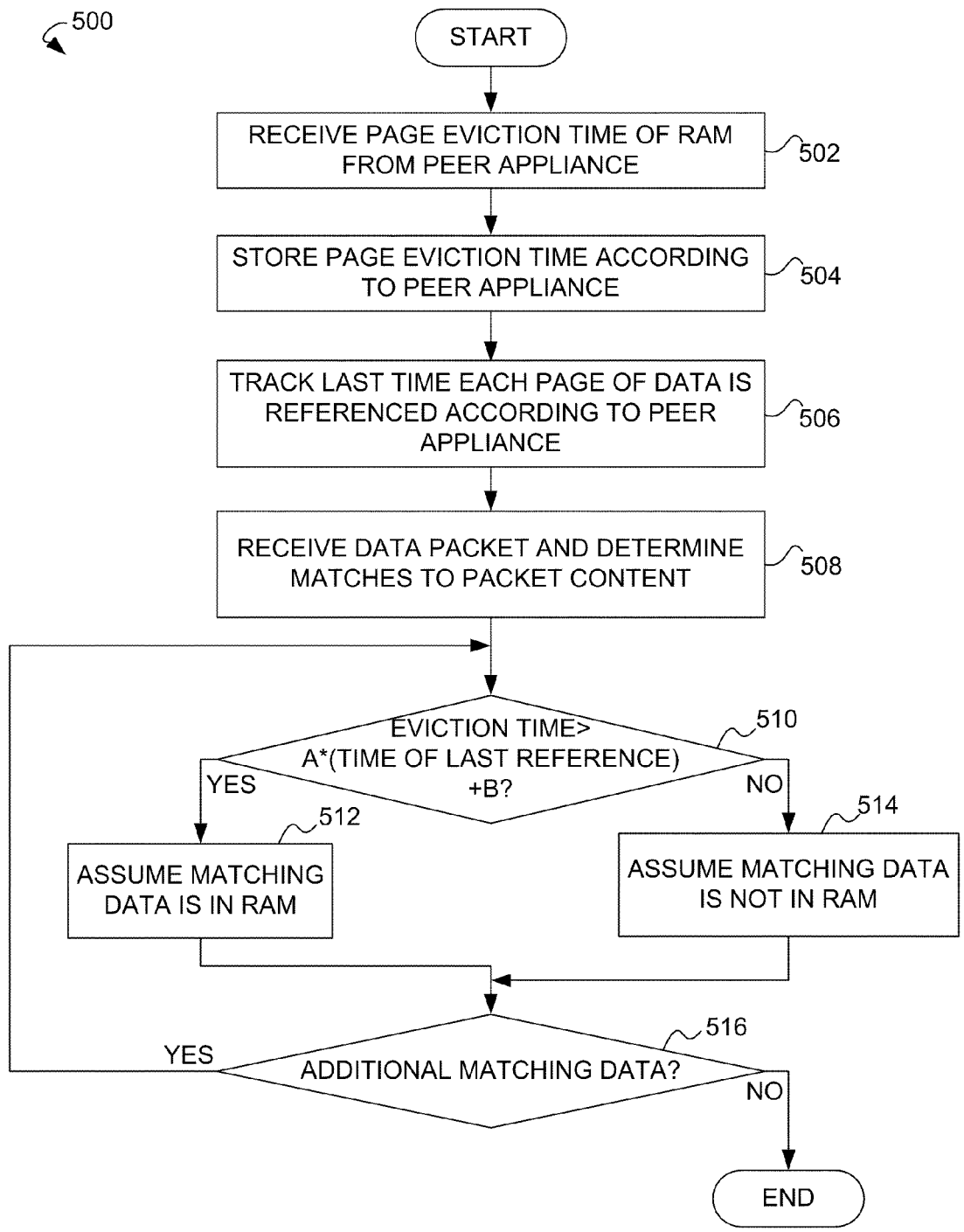
FIG. 5 is a flowchart of a method for estimating whether matching data is stored in RAM in one embodiment of the present invention.

FIG. 5 is a flowchart illustrating a process 500 for estimating whether matching data may be stored in the faster memory of a peer appliance (step 408 in FIG. 4), in one embodiment of the invention. The transmitting appliance 200 performs process 500 when responding to data packets from one or more computers 140 or servers 170. In some embodiments, the faster memory may be rapid access memory 320. As described herein, the receiving appliance 300 may comprise a central appliance 180 or a branch appliance 150.

In step 502, the transmitting appliance 200 receives a page eviction period in the faster memory (e.g., rapid access memory 320) from one or more peer appliances. The page eviction period is defined as the time from when a page is first read into the faster memory until the page is evicted and/or replaced by other data. The page may be evicted according to a least recently used policy. In a least recently used policy, data is overwritten based on the last time the data was accessed. For example, recently accessed data will be maintained while data that has not been accessed over a longer period of time may be overwritten.

In some embodiments, the page eviction period may be the current life in RAM of the data. For example, if the peer appliance is handling many requests or has a high data access activity level, more data will be sent to and from the faster memory in a short period of time, such that the eviction period may only be, for example, three minutes. However, if the peer appliance is not very active or has a low data access activity level, the content stored in the faster memory is not refreshed or purged as frequently and the eviction period may be much longer, perhaps hours or days. In step 504, the transmitting appliance 200 stores the page eviction period according to peer appliance. In some embodiments, the page eviction period may be used to overwrite a previous page eviction period associated with the peer appliance.

In step 506, the transmitting appliance 200 tracks the last time each page of data is referenced according to the peer appliance in which the page of data is stored. The transmitting appliance 200 may track each page of data as the transmitting appliance 200 transmits retrieve instructions or literal data as described in connection with FIG. 4. In step 508, the transmitting appliance 200 receives a data packet from a peer appliance and determines matches to packet content as described herein.

In step 510, the transmitting appliance 200 compares the page eviction period received from the peer appliance that sent the data packet to the time of last reference of the matching page of data. The calculation may be adjusted according to a multiplier A and/or an offset B to achieve greater accuracy and/or a more conservative estimate of whether the matching data is located in the faster memory.

If the eviction period is greater than the calculated time of last access, the transmitting appliance 200 may assume that the matching data is stored in the faster memory of the peer appliance in step 512. If, however, the eviction period is not greater than the calculated time of last access, the transmitting appliance 200 may assume that the matching data is not stored in the faster memory of the peer appliance in step 514.

In step 516, the transmitting appliance 200 determines whether there is additional matching data. If there is other matching data, the process 500 returns to step 510 to estimate whether the matching data is in the faster memory. If there is no additional matching data, the process 500 is complete.

Figure 6:
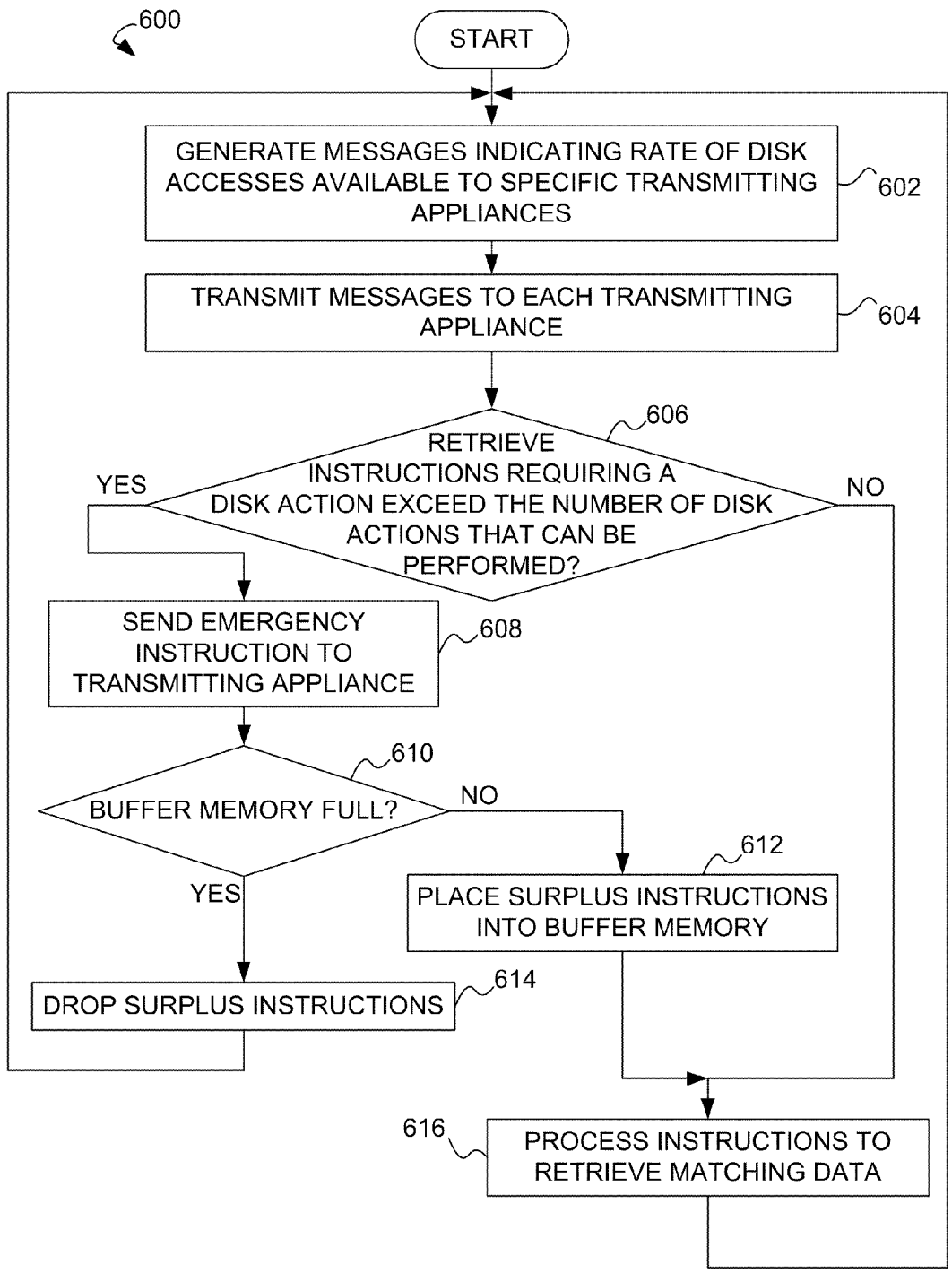
FIG. 6 is a flowchart of a method for determining a rate of disk accesses in one embodiment of the present invention.

FIG. 6 is a flowchart illustrating a receiving process 600 according to an exemplary embodiment of the present invention. The receiving appliance 300 and/or the peer appliances may perform the receiving process 600. The transmitting appliances may comprise one or more transmitting appliances 200, in some embodiments.

In step 602, the receiving appliance 300 generates status messages indicating a rate of disk accesses available to specific transmitting appliances. The receiving appliance may generate the status message according to an observed or otherwise known access count. For example, a receiving appliance may generate a message indicating that N disk accesses are available every 100 milliseconds. In some embodiments, the receiving appliance may further indicate that the size of a disk access is, for example, 100 k bytes. Thus, a 500 k byte request will count as five disk accesses.

A receiving appliance 300 may be further configured to receive and process retrieve instructions from more than one transmitting appliance 200. The receiving appliance 300 may generate a uniform message to send to each transmitting appliance 200. In alternative embodiments, the receiving appliance 300 may generate separate messages indicating a unique number of disk accesses available to each of the transmitting appliances 200.

In further embodiments, the receiving appliance 300 may generate messages indicating an aggregate rate of disk accesses available that exceeds the actual capability of the receiving appliance 300 to process retrieve instructions. This concept is analogous to an airline that overbooks a flight on the assumption that some passengers may not actually make the flight. For example, the receiving appliance 300 may be able to handle five hundred disk accesses every one hundred milliseconds but may send messages to three transmitting appliances 200 indicating three hundred disk accesses, four hundred disk accesses and one hundred disk accesses, respectively. Thus, the receiving appliance 300 may be oversubscribed by three hundred disk accesses every one hundred milliseconds. By oversubscribing, transmitting appliances 200 are allowed to send more retrieval instructions to the receiving appliance 300 without unnecessarily delaying the transmission of instructions. The receiving appliance 300 would appear to be overloaded but is capable of handling the extra disk accesses because the receiving appliance 300 is not concurrently processing retrieval instructions from other transmitting appliances 200. Alternatively, the receiving appliance 300 may oversubscribe the transmitting appliances 200 based on the constants A and B used to estimate whether the matching data is in the rapid access memory 320 in step 510 (FIG. 5). In step 604, the receiving appliance 300 transmits the messages to the transmitting appliances 200.

In step 606, the receiving appliance 300 determines whether the number of retrieve instructions received from the transmitting appliances 200 that require a disk action exceeds the number of disk actions that can be performed. This determination may be based on a processing time, a threshold, or a rate. In other embodiments, the determination may be made according to which transmitting appliance 200 the instruction is received from. Instructions that require a retrieve from the faster memory or transmissions that include literal data are not included in this determination as a disk action is not required. If the number of disk actions is not exceeded, the receiving process 600 proceeds to step 616 and the instructions are processed to retrieve matching data.

If the number of disk actions is exceeded or the receiving appliance 300 is otherwise overloaded, the receiving appliance 300 sends an emergency instruction or other status message to at least one of the transmitting appliances 200 in step 608. The emergency instruction may comprise an instruction to stop sending instructions likely to require a disk access. The receiving appliance 300 may transmit the emergency instruction to every transmitting appliance 200, or alternatively, to a sub-set comprising one or more transmitting appliances 200.

In step 610, the receiving appliance 300 determines whether a buffer memory (not shown) is full. A buffer memory may comprise an additional memory dedicated to storing retrieve instructions that are received by the receiving appliance 300. The buffer memory may comprise a faster memory, such as rapid access memory 320, or a slower memory such as slower memory 330. If the buffer memory is not full, the receiving appliance 300 stores "surplus" retrieve instructions from the transmitting appliance 200 that require a disk action that the receiving appliance 300 is not able to process immediately. However, if the buffer memory is full, the receiving appliance 300 may drop the surplus retrieve instructions in step 614.

In step 616, the receiving appliance 300 processes the retrieve instructions to retrieve matching data from the slower memory 330. The receiving appliance 300 may process retrieve instructions as they are received, or alternatively, from the buffer memory. The receiving appliance 300 may transmit the matching data to the computers 140 or to the central servers 170.

FIG. 7 depicts a message sequence chart illustrating an exemplary data exchange according to various embodiments of the invention. The messages in the sequence chart may be transmitted between the central server 170, the central appliance 180, the branch appliance 150, and the computer 140. In some embodiments, the branch appliance 150, acting as a receiving appliance 300, monitors disk activity in step 704 and the central appliance 180, acting as a transmitting appliance 200, tracks a number of reference data instructions in step 702. The branch appliance 150 transmits one or more status messages comprising, for example, a page eviction period of the rapid access memory 320 and/or an allowable activity level of the slower memory 330 to the central appliance 180. In other embodiments, the status message may comprise a bitmap index indicating the contents of the faster memory.

In one embodiment, the central server 170 transmits a data packet to the central appliance 180 to indicate data to be received by the computer 140. In step 706, the central appliance 180 determines whether there is any locally accessible matching data in the branch. If there is matching data, the central appliance 180 determines the time of last reference to data matching the data within the data packet within the branch appliance 150 as discussed in connection with steps 404 and 406 of FIG. 4. In step 708, the central appliance 180 may further determine whether the page eviction period of the RAM 320 is less than the time of the last access to the data. If the page eviction period is greater than the time of last reference, the central appliance 180 transmits a retrieve instruction to the branch appliance 150.

In step 710, if the page eviction period is less than the time of last access, the central appliance 180 may determine whether the number of retrieve instructions is less than the allowable activity level of the slower memory 330. If the number of retrieve instructions is not less than the allowable activity level, the central appliance 180 may transmit literal data to the branch appliance 150. When the central appliance 180 transmits literal data, the branch appliance 150 does not perform a disk action or otherwise access slower memory. Alternatively, if the number of retrieve instructions is less than the allowable activity level, the central appliance 180 may transmit reference data indicating data to be retrieved from the slower memory 330 in the branch appliance 150. The central appliance 180 may track the number of retrieve instruction likely to require disk activity.

In step 712, the branch appliance 150 reconstructs the data packet sent from the central server 170. The data packet may comprise data retrieved from the rapid access memory 320, sent literally from the central appliance 180, and/or retrieved from slower memory 330. The branch appliance 150 transmits the reconstructed data packet to the computer 140.

In step 714, the branch appliance 150 determines whether the slower memory 330 is overloaded with reference data. If the slower memory 330 is overloaded with retrieve instructions, the branch appliance 150 transmits an emergency instruction to the central appliance 180. The emergency instruction may indicate that the branch appliance 150 can not process retrieve instructions that are likely to require a disk access. In some embodiments, the emergency instruction may indicate a specified period of time or a separate instruction may be used to remove the emergency instruction. In further embodiments, the next periodic update may override the emergency instruction.

It should be noted that the terms "branch appliance" and "central appliance" are used to illustrate various embodiments. In operation a branch appliance is interchangeable with a central appliance. Further, any appliance may perform as a transmitting appliance or as a receiving appliance. In some instances, an appliance may act as a transmitting appliance while simultaneously acting as a receiving appliance.

The above-described functions can be comprised of executable instructions that are stored on computer readable storage medium. The executable instructions can be retrieved and executed by a processor. Some examples of executable instructions are software, program code, and firmware. Some examples of computer readable storage medium are memory devices, tape, disks, integrated circuits, and servers. The executable instructions are operational when executed by the processor to direct the processor to operate in accord with the invention. Those skilled in the art are familiar with executable instructions, processor(s), and computer readable storage medium.

What is claimed is:

1. A system for managing network memory, the system comprising:
    a first appliance in communication with a collocated computer and in communication with a second appliance via a wide area network, the second appliance including a faster memory and a slower memory;
    a communication interface included in the first appliance, the communication interface configured to receive a data packet from the computer and receive a status message from the second appliance, the status message indicating an activity level of the faster memory and the slower memory; and
    a processor included in the first appliance, the processor configured to determine the activity level of the faster memory and the slower memory from the status message, identify any data that is locally accessible to the second appliance and that matches the data packet, and determine based on the activity level whether to send the data packet literally from the first appliance to the second appliance or to send an instruction from the first appliance to the second appliance to retrieve the matching data locally, wherein data that is locally accessible to the second appliance is stored in the faster memory or the slower memory.

2. The system of claim 1, wherein the processor is further configured to limit data access to the slower memory in the second appliance.

3. The system of claim 1, wherein the processor is further configured to estimate whether the matching data is stored in the slower memory, and slow the rate at which instructions for data retrieval are generated when the activity level of the slower memory is above a maximum activity level and the estimate indicates that the matching data is stored in the slower memory.

4. The system of claim 1, wherein the activity level comprises a rate of access to the slower memory.

5. The system of claim 1, wherein the activity level comprises a period of data eviction in the faster memory.

6. The system of claim 1, wherein the status message indicates an eviction period.

7. The system of claim 1, wherein the status message indicates stored data in the faster memory.

8. The system of claim 1, wherein the faster memory comprises a random access memory.

9. The system of claim 1, wherein the slower memory comprises a disk memory.

10. A method for managing network memory, the method comprising:
    receiving a status message at a communication interface included in a first appliance, the first appliance in communication with a collocated computer and in communication with a second appliance via a wide area network, the second appliance including a faster memory and a slower memory, the status message received from the second appliance and indicating an activity level of the faster memory and the slower memory;
    receiving a data packet from the computer at the first appliance;
    determining an activity level of the faster memory and the slower memory from the status message;

identifying any data that is locally accessible to the second appliance and that matches the data packet, wherein data that is locally accessible to the second appliance is stored in the faster memory or the slower memory; and determining based on the activity level whether to send the data packet literally from the first appliance to the second appliance or to send an instruction from the first appliance to the second appliance to retrieve the matching data locally.

11. The method of claim 10, further comprising limiting data access to the slower memory in the second appliance.

12. The method of claim 10, further comprising estimating whether the matching data is stored in the slower memory, and modifying a slower memory count when the activity level of the slower memory is below a maximum activity level and the estimate indicates that the matching data is stored in the slower memory.

13. The method of claim 10, wherein the activity level comprises a rate of accesses to the slower memory.

14. The method of claim 10, wherein the activity level comprises a period of data eviction in the faster memory.

15. The method of claim 10, wherein the status message indicates an eviction period.

16. The method of claim 10, wherein the status message indicates stored data in the faster memory.

17. A non-transitory computer readable storage medium having embodied thereon a program, the program being executable by a processor to perform a method for managing network memory, the method comprising:

receiving a status message at a communication interface included in a first appliance, the first appliance in communication with a collocated computer and in communication with a second appliance via a wide area network, the second appliance including a faster memory and a slower memory, the status message received from the second appliance indicating an activity level of the faster memory and the slower memory;

receiving a data packet from the computer at the first appliance;

determining an activity level of the faster memory and the slower memory from the status message;

identifying any data that is locally accessible to the second appliance and that matches the data packet, wherein data that is locally accessible to the second appliance is stored in the faster memory or the slower memory; and determining based on the activity level whether to send the data packet literally from the first appliance to the second appliance or to send an instruction from the first appliance to the second appliance to retrieve the matching data locally.

18. The computer readable storage medium of claim 17, wherein the activity level comprises a rate of accesses to the slower memory.

19. The computer readable storage medium of claim 17, wherein the activity level comprises a period of data eviction in the faster memory.

20. The computer readable storage medium of claim 17, wherein the status message indicates an eviction period.

* * * * *